Sept. 27, 1960 L. S. BUTMAN 2,954,086
CULTIVATOR ATTACHMENT FOR CRAWLER TRACTORS
Filed May 27, 1958
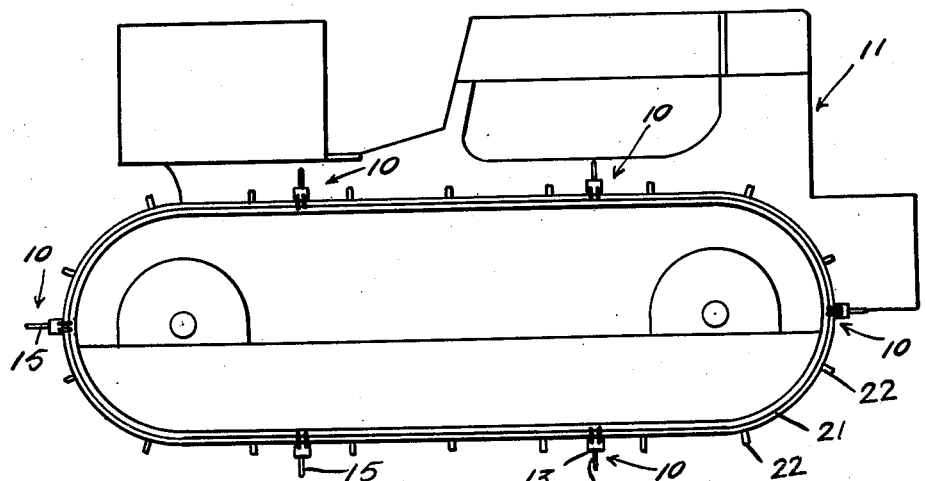
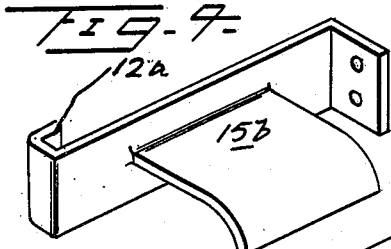
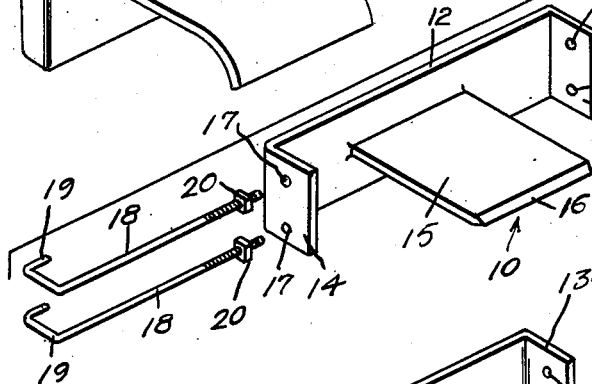
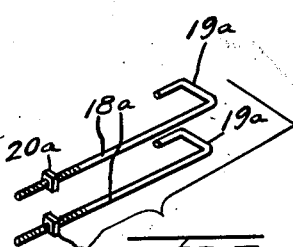
Louis S. Butman
INVENTOR
BY Kimmel & Crowell
ATTORNEYS.

2,954,086
CULTIVATOR ATTACHMENT FOR CRAWLER TRACTORS

Louis S. Butman, Rte. 4, Box 85, Merkel, Tex.

Filed May 27, 1958, Ser. No. 738,157

2 Claims. (Cl. 172—542)

The present invention relates to cultivator attachments for crawler tractors and particularly to such attachments which are detachably secured to the track laying tread of the tractor.

The primary object of the invention is to provide a detachable cultivator blade secured to the endless track of a track laying vehicle.

Another object of the invention is to provide a cultivator blade of the class described above which will penetrate a considerable distance into the ground to aerate the ground and promote the growth of grass thereon.

A further object of the invention is to provide a self contained cultivator blade unit which can be attached to the crawler track of a track laying vehicle without modifying the structure of the vehicle.

A still further object of the invention is to provide a cultivator blade of the class described above which is inexpensive to manufacture, simple to attach and which is effective in promoting the growth of grass and other plants in its use.

Other objects and advantages will become apparent in the following specification when considered in the light of the attached drawings in which:

Figure 1 is a side elevation of the invention shown attached to a crawler tractor;

Figure 2 is an exploded perspective view of the preferred form of the invention;

Figure 3 is an exploded perspective view of a modified form of the invention; and Figure 4 is fragmentary detailed view showing a modified form of blade.

Referring now to the drawings in detail wherein like reference characters indicate like parts throughout the several figures, the reference numeral 10 indicates generally a cultivator attachment for a crawler tractor 11 of conventional construction.

The cultivator attachment 10 comprises an elongated, generally rectangular transversely extending plate 12 having flanges 13 and 14 integrally formed on opposite ends thereof and extending upwardly therefrom in parallel relation. A generally rectangular cultivator blade 15 is secured to the plate 12 at one end and projects outwardly therefrom in perpendicular relation thereto. The blade 15 has the outer edge sharpened at 16 to facilitate the penetration of the earth. The flanges 13 and 14 are each provided with a pair of spaced apart bores 17 to receive a pair of bolts 18 having reverted hooked ends 19 integrally formed on the outer end thereof. Nuts 20 are provided for securing the bolts 18 in the bores 17. To attach the cultivator attachment 10 to the crawler tractor 11, the plate 12 is engaged against the track 21 in transversely extending relation intermediate a pair of the conventional cleats 22. The bolts 18 are arranged with the hooks 19 thereof engaging over the opposite side edges of the track 21 and the nuts 20 are tightened to releasably secure the cultivator 10 to the track 21. To operate the cultivator after attachment, the tractor 11 is moved along the ground in the usual manner and the cultivator blade 15 penetrates the earth on each revolution of the track 21.

A modified form of the invention is illustrated in Figure 3, wherein a generally rectangular bar 12a is provided at one end with an upstanding flange 13a and at the opposite end with a reverted hook 14a integrally formed with the bar 12a and extending oppositely of the flange 13a. A generally rectangular cultivator blade 15a is secured to the bar 12a at one end thereof and extends perpendicularly outwardly therefrom oppositely of the reverted hook 14a. The cultivator blade 15a has the outer edge thereof sharpened at 16a to assist in its penetration of the ground. The flange 13a has a pair of bores 17a formed therein to receive threaded bolts 18a having reverted hooked ends 19a formed integrally thereon. A pair of nuts 20a are provided for detachably securing the bolts 18a in the bores 17a.

A slightly modified form of construction is disclosed in Fig. 4 wherein the blade 15b is curved along an axis at right angles to the direction of movement of the track along a line near its outer edge, the arrangement being such that the sharpened edge of the blade is substantially perpendicular to the ground at its point of initial contact.

In attaching the modified form of the cultivator attachment 10a to a crawler tractor 11, the reverted hook 14a is engaged over one edge of the track 21 with the bar 12a extending transversely thereto. The bolts 18a are positioned with the hooks 19a thereof engaged over the opposite edge of the track 21 and the nuts 20a are tightened against the flange 13a to releasably secure the cultivator attachment 10a to the tractor 11.

The ordinary cleats of a tractor of the nature of the tractor 11 do not penetrate the ground to a sufficient extent to form aeration and irrigation openings through the surface crust. By use of the cultivator attachments 10, 10a, an effective, relatively inexpensive means are provided to pit range land to promote the growth of grass thereon, where ordinary methods of cultivation would be entirely too expensive to be efficiently practical.

Having thus described the preferred embodiments of the invention, it should be understood that numerous structural modifications and adaptations may be resorted to without departing from the scope of the appended claims.

What is claimed:

1. A cultivator attachment for the cleated track of a crawler tractor, comprising a substantially rectangular plate, a perpendicular flange on one end of said plate, a track engaging flange at the end of said first mentioned flange extending in parallel spaced relation to said plate adapted to engage beneath the edge of the track between the cleats thereof, a securing flange extending perpendicular to said plate in the direction opposite to that of said first mentioned flange and having bolt receiving openings therein, bolts having threaded ends adapted to extend through said openings, hook portions on the opposite ends of said bolts adapted to engage beneath the opposite edge of the track, nuts engaging the threaded ends of said bolts for clampingly securing said plate to the track, and a centrally disposed blade on said plate, said blade having a sharpened edge extending substantially beyond the end of said securing flange, and lying in a plane perpendicular to the plane of said perpendicular flanges and at right angles to the direction of movement of said track.

2. A device as claimed in claim 1 wherein said blade is curved along an axis at right angles to the direction of movement of said track along a line near its outer edge whereby said sharpened edge is substantially perpendicular to the ground at its point of initial contact with the ground.

References Cited in the file of this patent

UNITED STATES PATENTS

| | | |
|---|---|---|
| 1,258,683 | Houghton | Mar. 12, 1918 |
| 1,380,137 | Donohue | May 31, 1921 |
| 1,662,392 | Norberg | Mar. 13, 1928 |
| 1,832,926 | Edstedt | Nov. 24, 1931 |
| 2,161,486 | Rider | June 6, 1939 |
| 2,229,497 | Dontje | Jan. 21, 1941 |
| 2,701,169 | Cannon | Feb. 1, 1955 |
| 2,741,968 | Harris | Apr. 17, 1956 |

FOREIGN PATENTS

| | | |
|---|---|---|
| 163,906 | Great Britain | June 2, 1921 |
| 432,330 | Great Britain | July 24, 1935 |
| 275,950 | Italy | July 7, 1930 |